(12) United States Patent
Chen

(10) Patent No.: US 7,576,895 B2
(45) Date of Patent: Aug. 18, 2009

(54) LIGHT-GUIDE MODULE HAVING LIGHT SHIELDING STRUCTURE

(76) Inventor: Hsi-Yu Chen, 3F, No. 19, Lane 390, Fu Yuan Street, Taipei (TW)

( * ) Notice: Subject to any disclaimer, the term of this patent is extended or adjusted under 35 U.S.C. 154(b) by 751 days.

(21) Appl. No.: 10/937,265

(22) Filed: Sep. 10, 2004

(65) Prior Publication Data

US 2005/0254101 A1 Nov. 17, 2005

(30) Foreign Application Priority Data

May 11, 2004 (CN) .......................... 2004 1 0038168

(51) Int. Cl.
*H04N 1/04* (2006.01)
*H04N 1/46* (2006.01)
(52) U.S. Cl. ....................................... 358/474; 358/509
(58) Field of Classification Search ................. 358/474, 358/471, 400, 505, 509, 520, 475; 715/863; 347/129, 112, 111; 362/539, 538, 303, 305
See application file for complete search history.

(56) References Cited

U.S. PATENT DOCUMENTS

| | | | | |
|---|---|---|---|---|
| 1,680,039 | A * | 8/1928 | Hammond, Jr. | 84/338 |
| 2,184,157 | A * | 12/1939 | Jones | 356/629 |
| 4,355,897 | A * | 10/1982 | Kaye | 356/338 |
| 6,433,328 | B1 | 8/2002 | Chang | |
| 6,502,754 | B1 * | 1/2003 | Bhatia et al. | 235/472.01 |
| 6,720,985 | B1 * | 4/2004 | Lapstun et al. | 715/863 |
| 2001/0015828 | A1 * | 8/2001 | Miyamoto et al. | 358/474 |
| 2003/0030923 | A1 * | 2/2003 | Hsu et al. | 359/857 |
| 2003/0036204 | A1 * | 2/2003 | Stark et al. | 436/172 |
| 2003/0076546 | A1 * | 4/2003 | Johnson et al. | 358/474 |
| 2003/0183746 | A1 * | 10/2003 | Chen | 250/208.1 |
| 2003/0202223 | A1 * | 10/2003 | Shih | 358/475 |
| 2004/0114918 | A1 * | 6/2004 | Cahall | 396/374 |

FOREIGN PATENT DOCUMENTS

| | | |
|---|---|---|
| CM | 1122128 A | 5/1996 |
| CN | 2555512 Y | 6/2003 |

OTHER PUBLICATIONS

Litwiller, Dave; CCD vs. CMOS: Facts and Fiction; reprint from Jan. 2001; Photonics Spectra; Laurin Publishing Co. Inc.*

* cited by examiner

*Primary Examiner*—Gabriel I Garcia
(74) *Attorney, Agent, or Firm*—Workman Nydegger

(57) ABSTRACT

A light-guide module is used for guiding the incident light to a process device. The light-guide module includes an entrance and a plurality of reflected mirrors. The entrance is provided for entering the signal light. The reflected mirrors are arranged as a predetermined light route for guiding out the signal light. One of the reflected mirrors includes a light shielding structure for preventing the noise reflecting from the reflected mirror so as to prevent the noise light from entering the image sensing device and to prevent the image sensing device to process the noise.

16 Claims, 3 Drawing Sheets

LIGHT-GUIDE MODULE HAVING LIGHT SHIELDING STRUCTURE

BACKGROUND OF THE INVENTION (1) Field of the Invention

The invention relates to a light shielding structure adopted for use on reflected mirrors, and more particularly to a light shielding structure for a light-guide module of an image scanning apparatus or a multi-functional peripheral to prevent redundant light reflection of reflected mirrors of the light-guide module or noise signals from projecting to an image sensing device.

(2) Description of the Prior Art

Under the present demand for improving image resolution and shrinking device size, there is a constant requirement for image process apparatus (such as scanners or MFPs) to adopt an advanced design in the optical processing mechanism that generates digital image signals.

Refer to FIG. 1 for a conventional scanning device 10. It includes a cover plate 101, a light source 102, a scanning deck 104, a light-guide module 106, a lens 108 and an image sensing device 110. The cover plate 101 aims to cover a scanning object 30 located on the scanning deck 104. The light source 102 emits light to the scanning object 30. The light is reflected by the scanning object 30 and passes through an entrance 1066 to the light-guide module 106. The light-guide module 106 has a reflected mirror set which includes reflected mirrors. Four reflected mirrors 1061, 1062, 1063 and 1064 are taken as an example shown in FIG. 1. The reflected mirrors 1061 through 1064 aim to transmit light according to a preset light route to the lens 108. The lens 108 converges the light to become an image on the image sensing device 110 which transforms the receiving image light to digital signals. The light-guide module shown in FIG. 1 may be used on scanning apparatus and other image process devices such as MFPs.

With proper calibration, an incident light can project accurately to the center area of the four reflected mirrors shown in FIG. 1 and be precisely directed to the image sensing device. But the conventional reflected mirrors often are too big and light from other non-relevant light sources often occurs and projects to the light sensing device 110, such as an external light 1023 shown in FIG. 1. As a result, the scan image generated by the conventional scanning device 10 often is blurred by black shadows or noise signals.

Moreover, the light reflected by the object 30 also has incident angle problem, such as the light reflected by the first reflected mirror 1061 might directly project to the fourth reflected mirror 1064 and be directed to the image sensing device 110 (indicated by lights 1021 and 1022 shown in FIG. 1). Or some lights are directly projected to the fourth reflected mirror 1064 and form erratic reflection to the image sensing device 110 (many other erratic light reflections might also occur. They are not indicated in FIG. 1 to smooth reading). All this erratic reflection will generate redundant scanning images on the conventional scanning device 10 and result in undesirable scanning quality. This becomes even more serious in the high resolution.

In addition, in the event of the calibration of the reflected mirrors is not properly done such as the one shown in FIG. 1 (not accurate positioning of the reflected mirrors), even if the light is projected to the center area of the reflected mirror, the reflected light could deviate and cannot travel on the correct light route and project correctly to the reflected mirrors at the later stages. While the light might finally be reflected to the light sensing device, it is not a normal reflection and redundant scan images occur.

Therefore to design the reflected mirrors at a correct size to reflect light accurately without an extra reflecting area to reflect erratic light or noise signals is a goal pursued by scanner or MFP makers. However, due to fabrication technique and material constraints, there is a limitation for the dimension of the reflected mirrors. It is very difficult to produce reflected mirrors that fully meet the requirements. As the prevailing trend of product design demands compact size, to shrink the size of the reflected mirrors often result in mirror shattering and higher cost. Production and assembly become more complicated. Any damage of the reflected mirrors will increase the fabrication cost and time. When the reflected mirrors are too small, calibration of the reflected mirrors to form a correct light route also is more difficult. This is another concern of the design.

In view of the foregoing disadvantages, there is a need to provide a novel design for the reflected mirrors to overcome the problems of erratic reflection and noise signals occurred to the excessive size of the reflected mirrors, and the shattering and high cost occurred to the small size of the reflected mirrors.

SUMMARY OF THE INVENTION

Accordingly, it is an object of the present invention to provide a light shielding structure for reflected mirrors that can cover the excessive area of the reflected mirrors so that light reflected to the covered area is absorbed without directing to the image sensing device.

It is another object of the present invention to provide a light shielding structure that is easy to install on the excessive area of the reflected mirrors to reduce cost and increase assembly yield of the reflected mirrors.

It is yet another object of the present invention to maintain the original size of the reflected mirrors and provide a light shielding structure only on the excessive area to prevent erratic light reflection. As the dimension of the reflected mirrors is not altered, there is no need to change the configuration and calibration of the reflected mirrors, and redesign of the light-guide module is not necessary.

In one aspect, the invention provides a scanning apparatus to scan an image object. The scanning apparatus includes a light source, an image sensing device and a light-guide module. The light source aims to generate light to project to the image object and to be reflected thereof. The light-guide module includes at least one reflected mirror to transmit the reflecting light to the image sensing device. The image sensing device receives the light and generates corresponding digital signals. The reflected mirror includes a light shielding structure to prevent erratic light from occurring to the reflected mirror and directing to the image sensing device.

The present invention provides a simple design that couples a light shielding stricture on the excessive area of the original reflected mirror to absorb the erratic light or noise signals. It overcomes the conventional problems of adopting small reflected mirrors that results in a higher cost and difficult fabrication and assembly.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

The light-guide module of the invention is adopted for use on an image processing device that has to direct or change the light traveling route such as a scanning device or MFP. The light-guide module mainly aims to receive light from an entrance and reflect the light through reflected mirrors to an image sensing device. Namely, the reflected mirrors in the light-guide module can alter the traveling route of the light to reduce the size of the device. The following embodiment is based on adopting the invention to a scanning apparatus.

Figure 1:
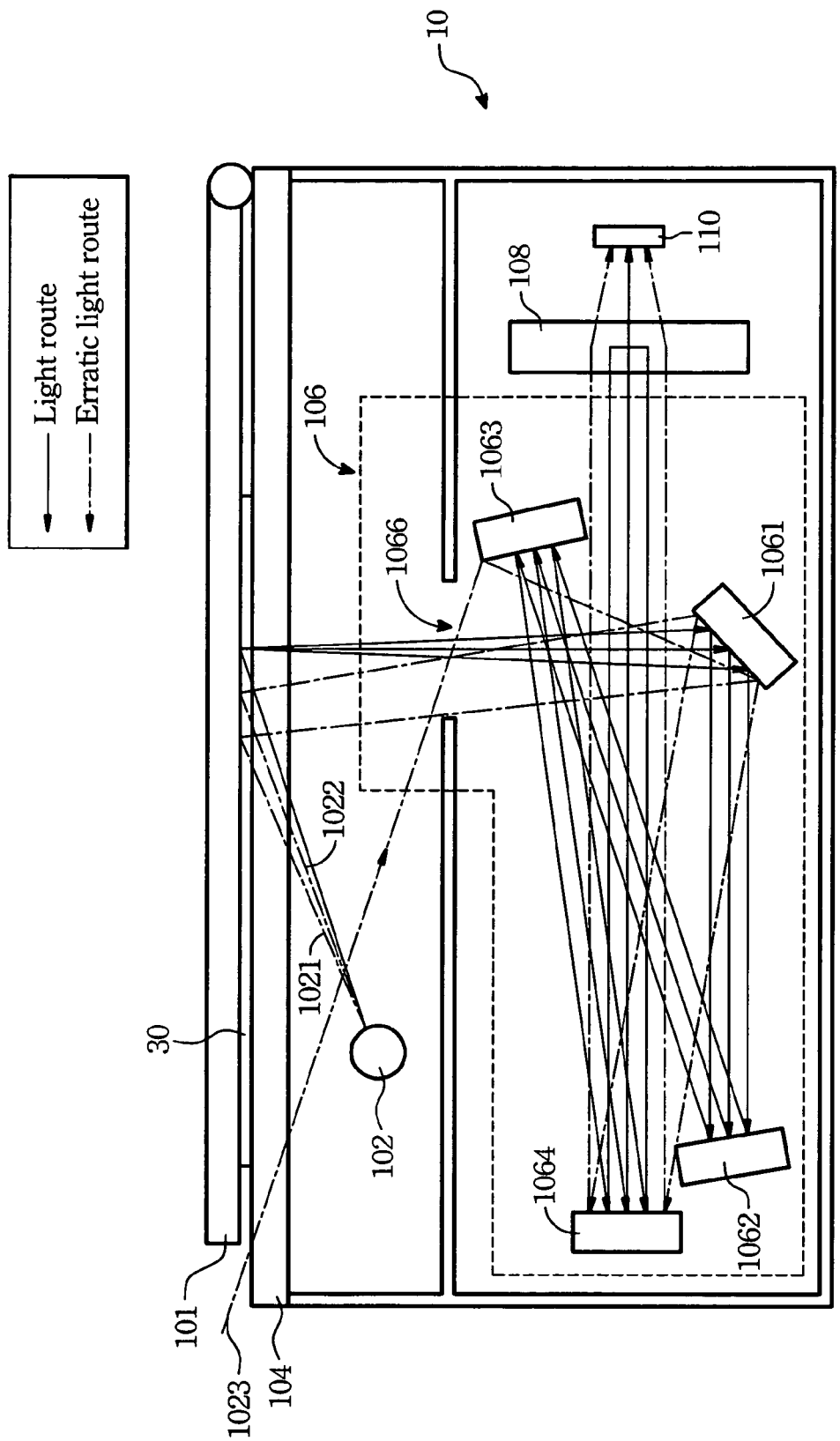
FIG. 1 is a schematic view of a conventional scanning apparatus.
Figure 2:
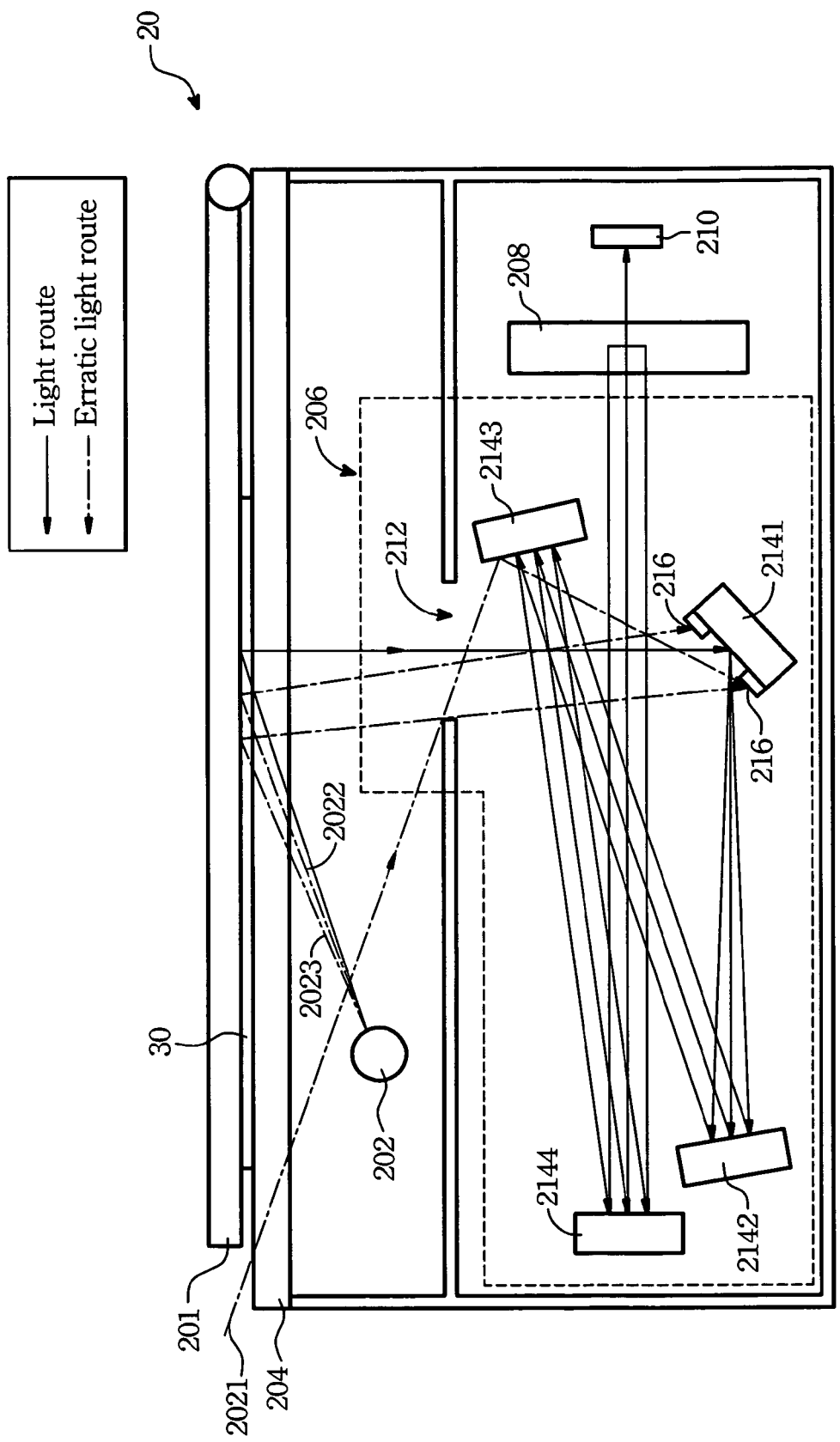
FIG. 2 is a schematic view of a scanning apparatus of the present invention.

Referring to FIG. 2, the scanning apparatus 20 includes a cover plate 201, a light source 202, a scanning deck 204, a light-guide module 206, a lens 208 and an image sensing device 210. The cover plate 201 aims to cover a scanning object 30 on the scanning deck 204. The light source 202 emits light to the scanning object 30. The light is reflected by the scanning object 30. The scanning deck is made of glass and can withstand the weight of the scanning object 30, and is transparent to allow the light to pass through. The light passes through the scanning deck 202 and projects to the light-guide module 206.

The light-guide module 206 includes an light entrance 212 and a reflected mirror assembly. In FIG. 2, the mirror assembly consists of four reflected mirrors 2141 through 2144. The number of the reflected mirrors depends on the individual design of users. In general, the number of the reflected mirrors ranges from two to eight. Light enters the light-guide module 206 through the light entrance 212, and is reflected by the reflected mirrors 2141, 2142, 2143 and finally 2144. The light then is reflected by the reflected mirror 2144 to the lens 208 which converges the light to the image sensing device 210. The image sensing device 210 transforms the light to digital signals which are processed by the scanning apparatus. At present the image sensing device 210 mainly includes two types, i.e. Charge-Coupled Device (CCD) and Complementary Metal Oxide Semiconductor (CMOS). It is to be noted that, aside from adopted on the scanning apparatus, the light-guide module of the invention may also be used on other image processing devices such as MFPs to direct signal light for image processing.

In one aspect, the invention includes one light shielding structure on at least one of the reflected mirrors. As shown in FIG. 2, the reflected mirror 2141 has a light shielding structure 216 located thereon. As previously discussed, the reflected mirrors of the conventional techniques have excessively large reflected mirrors that result in erratic reflection or noise signals. The invention, by deploying the light shielding structure 216 on the excessive area, can absorb the unnecessary light (such as lights 2021, 2022 and 2023 shown in FIG. 2) without reflecting to the image sensing device 210.

Figure 3:
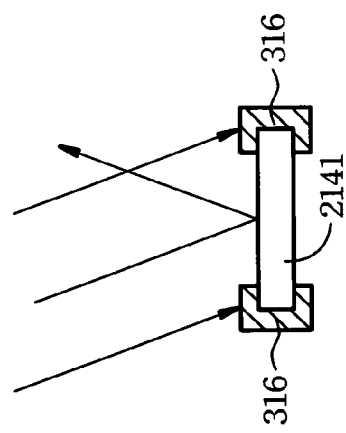
FIG. 3 is a schematic view of a first embodiment of the reflected mirror and light shielding structure of the invention according to FIG. 2.

Refer to FIG. 3 for a first embodiment of the reflected mirror 2141 and the light shielding structure 216 of the invention shown in FIG. 2. In this embodiment, the light shielding structure 216 is a black covering sleeve 316 to cover the excessive area of the reflected mirror 2141. The size and location of the excessive area and the corresponding size of the black covering sleeve 316 may be determined by a simple calculation by those skilled in the art. The black covering sleeve 316 can absorb the incident light, and the rest area other than the black covering sleeve serves as the normal reflecting area to reflect light. Thus erratic light reflection or noise signals may be prevented. To reduce the fabrication cost, the black covering sleeve may be made from rubber or the like.

Figure 5:
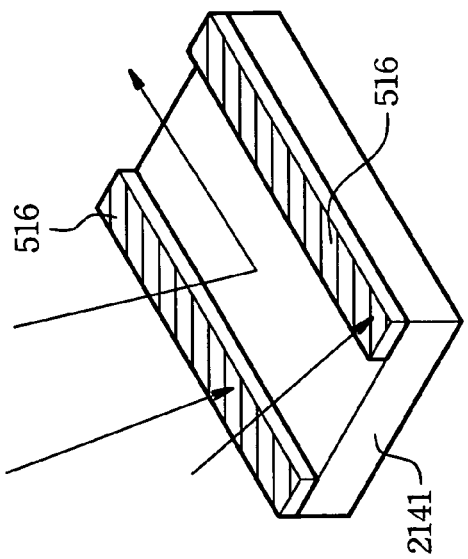
FIG. 5 is a schematic view of a third embodiment of the reflected mirror and light shielding structure of the invention according to FIG. 2.
Figure 4:
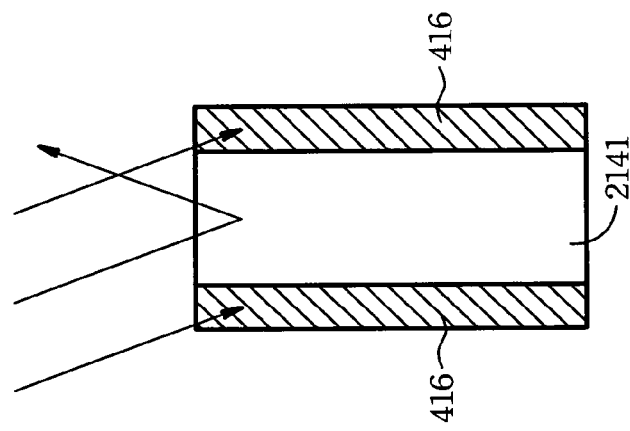
FIG. 4 is a schematic view of a second embodiment of the reflected mirror and light shielding structure of the invention according to FIG. 2.

Refer to FIG. 4 for a second embodiment of the reflected mirror 2141 and the light shielding structure 216 of the invention shown in FIG. 2. In this embodiment, the light shielding structure 216 is a black printing zone 416 formed on the excessive area of the reflected mirror 2141. It can produce the same effect as the black covering sleeve 316 set forth above. FIG. 5 illustrates a third embodiment of the reflected mirror 2141 and the light shielding structure 216. In this embodiment, the light shielding structure 216 is formed by bonding a piece of light shielding paper 516. It also can absorb the erratic light and noise signals.

Simulation data are provided below to further elaborate the present invention. Assuming the dimension of the reflected mirror 2141 is 20 mm×200 mm×5 mm (width×length×thickness), to those skilled in the art, the center reflecting area may be calculated as 5 mm×200 mm (width×length). The excessive area on two sides of the reflected mirror is 7.5 mm×200 mm (width×length). The light shielding structure may be formed by a black covering sleeve at a size of 7.5 mm×200 mm×5 mm with a hollow interior to couple on the excessive area of the two sides of the reflected mirror. Another approach is to print a black zone on the surface of two sides of the reflected mirror at a dimension of 7.5 mm×200 mm. Still other approach is to bond two pieces of black paper at a dimension of 7.5 mm×200 mm to the two sides of the reflected mirror. All these embodiments can prevent unnecessary light from projecting to the image sensing device. As the reflected mirrors and their size may vary according to design requirements, the simulation data previously discussed serve only for illustrative purpose, and is not the limitation of the invention.

It is to be noted that, the light shielding structure may be adopted on one or more reflected mirror rather than the first reflected mirror set forth above. The correct reflecting area and the erratic reflecting zone of each reflected mirror may be calculated to design the corresponding light shielding structure. By adopting the invention, even if the configuration of the reflected mirrors is not in an optimal condition and deviation of light route occurs, the light shielding structure can mask the area caused by the erratic light route to absorb the erratic light and prevent the erratic light from projecting to the image sensing device. Hence the invention can make design of the reflected mirrors easier.

In another aspect, besides shielding the excessive area of the reflected mirror by the three types of light shielding structures previously discussed, many other types of light shielding designs may be adopted. Details are omitted. As long as they adopt the principle and spirit of the invention, they should be deemed within the scope of the present invention.

In summary, the present invention adds a light shielding structure to the reflected mirror to prevent unnecessary light from projecting to the image sensing device and eliminate noise signals. Signal processing quality is enhanced. Moreover, the light shielding structure of the invention is added to the reflected mirror. Fabrication is easy. Configuration and calibration of the reflected mirrors also are simple. And the original reflected mirrors may be used without the need to specially design smaller reflected mirrors. Fabrication and assembly are simpler, and the cost is lower.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

I claim:

1. A scanning apparatus for scanning an object, comprising:
    a light source for generating light to project to the object; and
    a light-guide module for transmitting light reflected from the object, the light-guide module including:
        at least one reflected mirror, including a first reflected mirror, to reflect the light reflected from the object to an image sensing device according to a preset light route; and
        a light shielding structure located at a reflecting surface of the first reflected mirror to inhibit noise signals and the light reflected from the object that is not reflected according to the preset light route from reflecting to the image sensing device;
        wherein the image sensing device transforms the light transmitted by the light-guide module to corresponding output signals.

2. The scanning apparatus of claim 1, wherein the image sensing device is a charge-coupled device (CCD).

3. The scanning apparatus of claim 1, wherein the image sensing device is a Complementary Metal Oxide Semiconductor (CMOS).

4. The scanning apparatus of claim 1, wherein the light shielding structure is formed on the first reflected mirror by a black printing process to prevent the first reflected mirror from reflecting the noise signals.

5. The scanning apparatus of claim 1, wherein the light shielding structure is formed by bonding a piece of black paper to the first reflected mirror to prevent the first reflected mirror from reflecting the noise signals.

6. A scanning apparatus for scanning an object, comprising:
    a light source for generating light to project to the object; and
    a light-guide module for transmitting light reflected from the object, the light-guide module including:
        at least one reflected mirror, including a first reflected mirror, to reflect the light reflected from the object to an image sensing device according to a preset light route; and
        a light shielding structure located at a reflecting surface of the first reflected mirror to inhibit noise signals and the light reflected from the object that is not reflected according to the preset light route from reflecting to the image sensing device;
        wherein the image sensing device transforms the light transmitted by the light-guide module to corresponding output signals;
        wherein the light shielding structure is a black covering sleeve matching a contour of the first reflected mirror for coupling on the reflected mirror.

7. The scanning apparatus of claim 6, wherein the black covering sleeve is made from rubber.

8. A light-guide module for directing a signal light to an image sensing device, the light-guide module comprising:
    an entrance to receive projection of the signal light;
    a plurality of reflected mirrors positioned on a preset route to direct the signal light according to the preset route to the image sensing device; and
    a light shielding structure positioned at a reflecting surface of at least one of the reflected mirrors to inhibit a noise signal from reflecting to the image sensing device and to inhibit a portion of the signal light not traveling on the preset light route from reflecting to the image sensing device;
    wherein the light shielding structure is a black covering sleeve matching a contour of the at least one reflected mirror for coupling on the reflected mirror.

9. The light-guide module of claim 8, wherein the image sensing device is a charge-coupled device (CCD).

10. The light-guide module of claim 8, wherein the image sensing device is a Complementary Metal Oxide Semiconductor (CMOS).

11. The light-guide module of claim 8, wherein the black covering sleeve is made from rubber.

12. The light-guide module of claim 8, wherein the light-guide module is used in scanning apparatus to direct light to a scanning object.

13. The light-guide module of claim 8, wherein the light-guide module is used in a multi-functional peripheral to direct light to an object to perform image processing.

14. A scanning apparatus for scanning an object; comprising:
    a light source for generating light to project to the object;
    a plurality of mirrors that form a light route to an image sensing device, the plurality of mirrors including a first mirror, wherein the plurality of mirrors direct light reflected from the object to the image sensing device according to the light route; and
    means for inhibiting noise signals and light that does not follow the light route from reflecting to the image sensing device, the means for inhibiting positioned at a reflecting surface of the first mirror;
    wherein the means for inhibiting further comprises a black covering sleeve matching a contour of the first mirror for coupling on the first mirror.

15. The scanning apparatus of claim 14, wherein the black covering sleeve is made from rubber.

16. The scanning apparatus of claim 14, wherein the means for preventing is formed on a reflecting surface of the first mirror.

* * * * *

UNITED STATES PATENT AND TRADEMARK OFFICE
CERTIFICATE OF CORRECTION

PATENT NO. : 7,576,895 B2  Page 1 of 1
APPLICATION NO. : 10/937265
DATED : August 18, 2009
INVENTOR(S) : Chen It is certified that error appears in the above-identified patent and that said Letters Patent is hereby corrected as shown below:

Title Page:

(56) U.S. Patent Documents, Column 2, Line 2, delete "Lapstun et al." and insert --Silverbrook et al.--
(56) FOREIGN PATENT DOCUMENTS, Line 1, delete "CM" and insert --CN--

Column 6:
Claim 14, line 38, delete "object;" and insert --object,--

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,576,895 B2 Page 1 of 1
APPLICATION NO. : 10/937265
DATED : August 18, 2009
INVENTOR(S) : Hsi-Yu Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1121 days.

Signed and Sealed this

Fourteenth Day of December, 2010

David J. Kappos
*Director of the United States Patent and Trademark Office*